United States Patent [19]

Ibrahim et al.

[11] Patent Number: 5,405,658
[45] Date of Patent: Apr. 11, 1995

[54] SILICON COATING PROCESS

[75] Inventors: Jameel Ibrahim, Humble, Tex.; Robert E. Farritor; David W. Clary, both of Baton Rouge, La.

[73] Assignee: Albemarle Corporation, Richmond, Va.

[21] Appl. No.: 963,661

[22] Filed: Oct. 20, 1992

[51] Int. Cl.$^6$ ............................................. B05D 3/14
[52] U.S. Cl. .................................. 427/588; 427/237; 427/239; 427/248.1; 427/591; 427/598
[58] Field of Search ............... 427/598, 182, 185, 230, 427/588, 591, 237, 239, 248.1

[56] References Cited

U.S. PATENT DOCUMENTS

| | | | |
|---|---|---|---|
| 4,292,344 | 9/1981 | McHale | 427/45.1 |
| 4,668,493 | 5/1987 | Levin | 423/349 |
| 4,684,513 | 8/1987 | Iya | 423/349 |
| 4,748,052 | 5/1988 | Allen | 427/213 |
| 4,751,067 | 6/1988 | Levin | 423/349 |
| 4,784,840 | 11/1988 | Gautreaux et al. | 423/349 |
| 4,868,013 | 9/1989 | Allen | 427/213 |
| 4,883,687 | 11/1989 | Gautreaux et al. | 427/213 |
| 4,981,102 | 1/1991 | Gautreaux et al. | 118/725 |
| 5,041,308 | 8/1991 | Kuramoto | 427/213 |

FOREIGN PATENT DOCUMENTS 0150288  6/1991  Japan .

*Primary Examiner*—Bernard Pianalto
*Attorney, Agent, or Firm*—E. E. Spielman, Jr.

[57] ABSTRACT

This invention relates to an improved process for the thermal dehydrogenation of polysilicon granules in a fluidized bed reactor, the improvement which comprises introducing a varying electromagnetic field into the reactor whereby reactor walls are coated with silicon during the dehydrogenation.

6 Claims, No Drawings

SILICON COATING PROCESS

BACKGROUND OF THE INVENTION

This invention relates to a new process for applying, in a controlled manner, a silicon coating on the surface of an electrically conductive material. Such process is especially useful in coating the walls of fluidized bed reactors which are used in the dehydrogenation of polysilicon.

High purity monocrystalline silicon is in great demand as a semiconductor material. The purity of the silicon is critical as impurities, especially metal and hydrogen, can render the silicon unacceptable for some electronic uses.

Most of the world's supply of semiconductor grade silicon is produced from polycrystalline silicon, i.e., polysilicon, which in turn is produced from the thermal decomposition of a silicon source, e.g., silane, trichlorosilane and the like. The thermal decomposition can conveniently be carried out in a fluidized bed reactor into which is fed the silicon source material and a carrier or fluidizing gas. Such processes are exemplified in U.S. Pat. No. 4,784,052, U.S. Pat. No. 4,784,840, U.S. Pat. No. 4,868,013 and U.S. Pat. No. 4,883,687, which patents are all incorporated herein as if fully set forth. The polysilicon product from these processes is a free flowing powder comprised of essentially spherical polysilicon granules having a particle size range of from about 150 to about 3000 microns. Average particle size is from about 600 to about 1100 microns.

Despite the high purity of these granules, they oftentimes contain entrained hydrogen in unacceptable amounts. To reduce the hydrogen content the polysilicon can be treated at high temperature to cause a net diffusion of hydrogen out of the granules. It has been found that this dehydrogenation can be efficiently carried out in a fluidized bed reactor in which the polysilicon granules are heated to temperatures within the range of from about 900° to about 1300° C., with about 1150° C. being the preferred highest temperature. The fluidizing gas is hydrogen or argon, with hydrogen being preferred.

While the use of fluidized bed reactors is highly efficient in effecting dehydrogenation, the considerable turbulence that occurs within the reactor is conducive to an increase in product contamination if special precautions are not taken. The major contamination source is the metal or material which is abraded from the reactor walls by the turbulently moving polysilicon granules. This contamination can be easily obviated if the reactor surfaces in contact with the abrading polysilicon granules are of a material which is not a contaminant to the polysilicon, e.g., silicon. Non-abrading materials such as quartz, silicon carbide, etc., can be used. However their fragile nature and/or unavailability in the sizes needed argues against their use. Providing reactor parts of pure silicon, especially reactor walls, is problematical from a cost and design standpoint. Therefore, it is preferred to manufacture the walls from a convenient material, say graphite, and to then give the walls a coat of silicon. The coat of silicon can be applied prior to running the dehydrogenation process by thermally decomposing a silicon source, e.g., silane, in the reactor to yield silicon which coats out onto the reactor walls. This coating is formed at a temperature of about 600° C. and prior to running the much higher temperature dehydrogenation process in the reactor. After the coat is obtained no further silicon source is fed to the reactor. One disadvantage to using such a coating is that the coating will suffer attrition, cracking and flaking due to the abrading turbulent motion of the polysilicon, to thermal shock and to reactor vibration. When these deleterious effects become severe, which they will over time, exposure of the underlying wall material results. To prevent this exposure from occurring, the reactor walls can be periodically recoated. The recoating can be effected by shutting down the reactor as a dehydrogenator and, instead, running it to decompose a silicon source feed to generate silicon for the recoating. This periodic recoating, while effective, is not a panacea as the shut-downs interfere with production and can result in reactor damage due to thermal cycling. Thus, what is needed is a process which continuously regenerates a silicon coat on the reactor walls of a dehydrogenator during and without interruption of the dehydrogenation process.

THE INVENTION

This invention relates to an improved process for the thermal dehydrogenation of polysilicon granules in a fluidized bed reactor, which improvement comprises introducing a varying electromagnetic field into the reactor whereby reactor walls are coated with silicon.

The intensity of the electromagnetic field in the reactor will preferably vary cyclically between a minimum and a maximum value. The intensity of the field can also be referred to as the flux density of the field and can be quantified using the gauss as the unit of measure. The flux density needed to effect the coating produced by the process of this invention is believed to depend, at least in part, on the temperature of the fluidized bed and its resultant effect on the electrical conductivity and the chemical equilibrium characteristics of the particular polysilicon involved.

The polysilicon granules and the polysilicon dust associated therewith are not good conductors at temperatures under 600° C. However, their conductivity increases significantly as the temperature rises. For example, data on the electrical resistivity of silicon shows a resistivity of 4 ohms cm at 600° C. and a resistivity of only 0.01 ohms cm at 1300° C. It is believed, though the process of this invention is not to be restricted to such belief, that the coating effect of this invention depends upon the ability of the polysilicon to couple electrically with the electromagnetic field. This coupling ability is directly related to the electrical conductivity of the granules and dust and thus, to the their temperature. The higher the conductivity of the polysilicon the easier it is to obtain the coupling sought with a given flux density. Stated in other words, the flux density needed to obtain a given coating effect, is inversely related to the conductivity of the polysilicon. Considering the temperatures used in thermal dehydrogenation, i.e., from about 900° to about 1300° C. and preferably from about 1000° to about 1200° C., it can be seen that the polysilicon will have enhanced conductivity, thus facilitating the coupling necessary to yield the desired coating.

Determining the optimum flux density for a particular dehydrogenator can be achieved by empirical methods. For a given fluidized bed temperature and desired coating rate, the flux density is adjusted until the desired coating rate is obtained. In most cases the electromagnetic field will be generated by an inductor located about the reactor. The flux density realized inside of the reactor, for a given power input to the inductor, will depend upon the extent which the intervening reactor walls attenuate penetration of the electromagnetic field into the interior of the reactor. It is believed that the degree of penetration of the electromagnetic field is dependent upon the frequency of the alternating current fed to the inductor and upon the material from which the reactor walls are made. The extent of penetration can also be attenuated by the presence of intervening electrically conductive walls, e.g., susceptor walls, etc., between the inductor and the reactor wall. When specifying the degree of penetration, the thickness of the reactor walls and intervening walls must also be accounted for so that there is insurance that an electromagnetic field of proper strength is extant inside of the reactor interior. With the number of parameters involved relative to electromagnetic field penetration, the selection of a particular inductor current frequency and field strength must be individually tailored for each different situation. Illustrating, for a reactor having walls made from graphite, which walls are nominally 2 inches thick, an inductor current of about 250–600 amperes and a frequency within the range of from about 800 to about 3000 Hz (cycles per second) is suitable to effect silicon coating in a dehydrogenation fluidized bed reactor run at about 1000°–1150° C. Generally, the inductor current frequency will be adjusted to provide the most efficient penetration for a given wattage. The frequency, in most of the above type situations, will preferably be within the range of from about 800 to about 2000 Hz. As a general rule for most all situations, a frequency within the range of from about 800 to about 4000 Hz will be suitable.

The inductor can be made of a single coil or of a multiplicity of coils. When multiple coils and power supplies are used, the current to each of the coils should have a frequency that is different from that fed to the other coils so that interference is avoided. Generally, the currents should differ by at least 20%. The number of coils used typically is within the range of 1 to 6. Three coils are particularly suitable.

In accordance with the process of this invention, the formation of the silicon coating occurs during and without interference with the dehydrogenation process. The coating rate should be that which is sufficient to insure a continuous silicon coating despite the attrition due to abrasion, cracking and flaking. It is preferred that the silicon coating rate be such that the coating is maintained with a nominally constant thickness so that there is not undue coating build-up. When build-up of the coating does occur, the reactor space can become restricted which may necessitate shutting the reactor down and removing a portion of the coating by etching of the coating with an acid such as HCl. While this shut down is not desirable, its frequency of occurrence will generally be much less than that which would be necessary if the coating is maintained by periodic coating with silicon from the decomposition of silane and the like. Maintenance of a nominally constant coating thickness can be accomplished by monitoring the coating thickness and adjusting the frequency of the inductor current to increase or decrease formation of the silicon coating as needed. Another technique is to match the rate of coating attrition with the rate of coating formation so that coating constancy is obtained. With this last technique, empirical data on attrition and coating rates can be used to select the inductor current frequency needed.

The polysilicon granules can be characterized as any of those which contain thermally diffusible hydrogen. Generally, the polysilicon will be produced by the thermal decomposition of a silicon source material which has a hydrogen constituent or substituent. The silicon source material is preferably silane ($SiH_4$) but could be a chlorosilane, such as dichlorosilane or trichlorosilane. Hydrogen is produced during the decomposition of both the silane and the chlorosilanes, with less hydrogen being produced in the case of the latter. However, the benefit of less hydrogen production for the cholorsilanes is more than offset by the presence of chlorine in the polysilicon product. Thus, from a chlorine contamination standpoint, a non-chlorine producing silicon source material, such as silane, is preferred.

The preferred form for the polysilicon is a free flowing powder comprised of hard substantially spherical granules. There is a polysilicon dust associated with the granules in the reactor. This dust appears to play a part in the coating process of this invention. The final polysilicon granules recovered from the reactor are substantially dust free, i.e., less than about 0.1 wt % and typically about 0.010 to about 0.070 wt %, due to techniques such as that described in U.S. Pat. No. 4,784,840. (The '840 patent is incorporated herein as if fully set forth.) Use of the '840 technique does not adversely affect the process of this invention. The granules have a size distribution which has a low end of from about 75 to about 150 microns and a high end of from about 3000 to about 4000. A preferred size distribution is from about 150–250 to about 2500–3000 microns. The average particle size generally will be within the range of from about 600 to about 1100 microns. The powder preferably contains less than 0.25 part per billion absolute (ppba) boron, less than about 0.19 ppba phosphorus, less than about 0.33 ppma carbon and up to about 1,000 ppma hydrogen. After dehydrogenation, the powder will generally have a hydrogen content down to about 30 ppma hydrogen or even lower. The density of the granules, measured as particle density in grams per cubic centimeter, is typically from about 2.25 to about 2.33. Preferred polysilicon powders have a bulk density of from about 1300 to about 1550 $Kg/m^3$.

The dehyrogenator operating pressure can be subatmospheric, atmospheric, or superatmospheric, with superatmospheric pressure, say 7–15 psig, being preferred.

The dehydrogenation process is run at temperatures which are conducive to efficient diffusion of hydrogen from the polysilicon granules but not so high, for example above about 1200° C., to cause softening or melting of the granules. Polysilicon has a melting point of about 1412° C. A soft or melted condition for the granules should be avoided as such results in the formation of undesirable agglomerates.

For more details concerning dehydrogenation of polysilicon granules, reference is made to Ser. No. 791,882, filed Nov. 13, 1991, and entitled "Polysilicon with Diminished Hydrogen Content" which is incorporated herein as if fully set forth.

As mentioned above, the process of this invention can be used with a reactor which presents only a single wall to the inductor or can be used with the combination of a reactor and a susceptor. The benefit of using a susceptor is to be found in the experience that the combination of just an inductor and reactor can result in uneven heating of the reactor walls which can yield hot spots. It has been found that the use of a susceptor between the inductor and the reactor can give uniform heating of the reactor wall. In its simplest form, the susceptor is a sleeve which fits over the reactor and is made of a material having good electrical conductivity, for example graphite. The susceptor, being an electrically conductive member, has a current induced in it by the inductor and thus is heated to a high temperature. This body of heat which is presented by the susceptor then in turn heats the reactor walls so as to obtain the necessary dehydrogenation temperature in the reactor. Since the transfer of heat between the susceptor and the reactor walls is predominately by radiation, any non-uniformity of temperature in the susceptor is not efficiently passed on to the reactor walls. Indeed, practice shows that with the use of a susceptor, the reactor walls will be given a substantially hot spot free temperature profile. Thus, the reactor walls are essentially uniform in temperature. For further details on the use of a susceptor to achieve temperature uniformity reference is made to Ser. No. 865,972, filed Apr. 9, 1992, and entitled "A Device for the Magnetic Inductive Heating of Reactors" which is incorporated herein as if fully set forth.

In accordance with this invention, when a susceptor is used, a portion of the electromagnetic flux from the inductor is lost to the susceptor but, there is still a sufficient amount of flux left to penetrate the reactor wall so that the flux density inside of the reactor can couple with the polysilicon granules to yield the desired coating. Thus, the presence of a susceptor requires that the inductor current frequency and power be adequate to make the penetration called for. Again, the selection of frequency and power is dependent on many parameters and, as a result, is suitably made based upon empirical study. Suitable inductor current frequencies for the combination of a reactor and susceptor, with the susceptor being made from 1 to 2 inches thick graphite, are exemplified by the range of from about 800 to about 2500 Hz. Inductor current amperages of from about 250 to about 650 amperes are suitable.

The inductor used in the process of this invention is preferably made from a hollow coil of conductive material, e.g., copper. The hollow space in the coil is filled with running cooling fluid, such as water.

What is claimed is:

1. In a process for the thermal dehydrogenation of polysilicon granules in a fluidized bed reactor, the improvement which comprises subjecting the polysilicon granules to a varying electromagnetic field within the reactor while the particles are at a temperature of from about 900° C. to about 1300° C., the particles being subjected to the varying electromagnetic field for a time sufficient to obtain a silicon coat on reactor walls.

2. The process of claim 1 wherein the electromagnetic field cyclically varies between a minimum and maximum value at a rate within the range of from about 800 to about 4000 cycles per second.

3. The process of claim 1 wherein the varying electromagnetic field is generated by an inductor which comprises an electrically conductive coil located around the reactor, which coil carries an electrical alternating current.

4. The process of claim 3 wherein the alternating current has a frequency within the range of from about 800 to about 4000 cycles per second.

5. A process for thermally dehydrogenating polysilicon granules in a fluidized bed reactor and simultaneously forming a silicon coat on interior reactor walls, which process comprises
   (a) fluidizing within the reactor polysilicon granules containing diffusible hydrogen;
   (b) maintaining thermal dehydrogenation conditions within the reactor; and
   (c) simultaneously providing a sufficient and varying electromagnetic flux density within the reactor whereby the silicon coating is obtained.

6. The process of claim 5 wherein the reactor walls are heated by radiation heat from a susceptor which is about the exterior of the reactor walls and which is inductively heated by an inductor, which inductor also provides for the electromagnetic field within the reactor.

* * * * *